United States Patent [19]

Maldague

[11] Patent Number: 4,886,523

[45] Date of Patent: Dec. 12, 1989

[54] PROCESS AND APPARATUS FOR AERODYNAMIC SEPARATION OF COMPONENTS OF A GASEOUS STREAM

[76] Inventor: Pierre E. Maldague, Avenue Winston Churchill 232, 1180 Brussels, Belgium

[21] Appl. No.: 192,793

[22] Filed: May 10, 1988

[30] Foreign Application Priority Data

May 11, 1987 [BE] Belgium ............................ 08700507

[51] Int. Cl.$^4$ .............................................. B01D 45/12

[52] U.S. Cl. .......................................... 55/1; 55/416; 55/394; 55/457; 210/512.1

[58] Field of Search ..................... 55/1, 456, 457, 416, 55/394; 210/512.1

[56] References Cited

U.S. PATENT DOCUMENTS

| | | | |
|---|---|---|---|
| 2,569,909 | 10/1951 | Umney | 55/416 |
| 3,258,895 | 7/1966 | Wiebe et al. | 55/1 |
| 3,616,616 | 11/1971 | Flatt | 55/394 |
| 4,311,494 | 1/1982 | Conner et al. | 55/394 |

FOREIGN PATENT DOCUMENTS

| | | |
|---|---|---|
| 0162509 | 11/1985 | European Pat. Off. . |
| 859607 | 1/1961 | United Kingdom . |

*Primary Examiner*—Bernard Nozick
*Attorney, Agent, or Firm*—Pollock, Vande Sande & Priddy

[57] ABSTRACT

This disclosure includes a process and apparatus for subsonic aerodynamic separation of components existing in condensed and/or condensable form in a gaseous stream, in which the gaseous stream undergoes successively an expansion up to high subsonic velocities and a recompression by deceleration, with inertial separation of the pre-existing particles as well as of the particles formed and/or enlarged by condensation. Within the flowing gaseous stream, a gradient of concentration of the particles is created, in the same direction as the pressure gradient within the stream. Separation of the particles occurs in an axisymmetric chamber bounded by an outer wall and an inner core and including a fixed array of deflecting blades for transforming the essentially axial motion of the stream entering the chamber into an helico-spiral motion, and a fixed array of straightening blades for transforming the helico-spiral motion of the stream before its exits from the chamber into an essentially axial motion. The inlet and outlet cross-sections of each array are cylindrical surfaces coaxial with the outer wall and the inner core. Condensation occurs by expansion of the gaseous stream particularly in an inner zone between the arrays at high subsonic velocity. Expansion is identical along all streamlines within the gaseous stream and the particles separating from each streamline of the gaseous stream are subject to identical centrifugal forces driving them towards the outer layer of the gaseous stream.

34 Claims, 1 Drawing Sheet

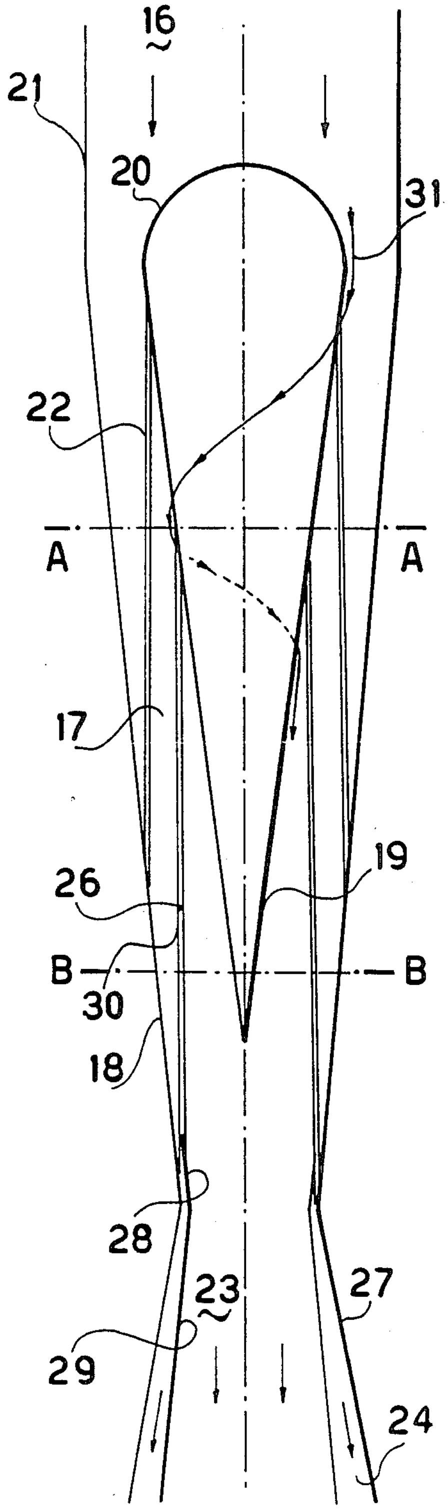
FIG. 1
FIG. 2
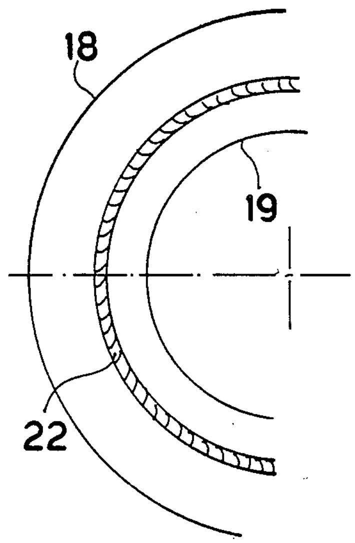
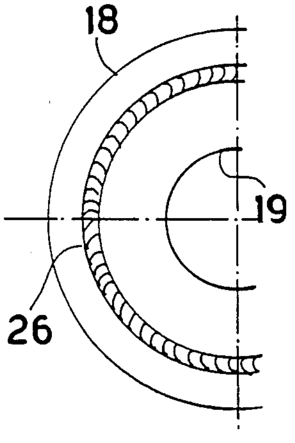
FIG. 3

PROCESS AND APPARATUS FOR AERODYNAMIC SEPARATION OF COMPONENTS OF A GASEOUS STREAM

TECHNICAL FIELD OF THE INVENTION

This invention relates to processes and apparatus for aerodynamic separation of liquid and solid particles from a gaseous medium, and includes as one of its particularly preferred applications processes and apparatus for subsonic aerodynamic separation of at least those components of a gaseous stream which are condensable and exist in vapor form.

BACKGROUND ART

The background art in the technical field of the invention is exemplified by European Patent Application No. 0,162,509, U.S. Pat. No. 3,258,895, British Patent Specification No. 859,607 and U.S. Pat. No. 4,311,494.

European Patent document No. 0,162,509 shows a drying process and corresponding apparatus which substantially recover available heat by heat pumping using an expansion/recompression sequence taking place in a subsonic convergent/divergent nozzle. The expansion of the gaseous stream within the convergent portion of the nozzle causes part of the vapor present in the gaseous stream to condense in the form of droplets which are separated inertially from the main stream and collected at or near the throat region of the nozzle. Auxiliary means may be provided at the inlet of the nozzle to initiate and/or enhance the condensation process. Other auxiliary means may be provided to enhance the inertial separation; a cascade of deflecting blades is shown, which induces a swirling action within the accelerating stream. This is turn causes the streamlines of the flowing gaseous medium to follow helico-spiral paths, thus creating a radial pressure gradient within the expanding stream. In fact, this pressure gradient causes differences in the amount of expansion taking place along streamlines at varying radii from the nozzle axis. The portion of the stream travelling along those streamlines nearest the inner wall of the separator undergoes maximum expansion, while those portions travelling on streamlines near the outer wall undergo less expansion and thus less vapor condensation. Furthermore, similar differences between streamlines exist in the centrifugal field which drives the droplets of condensate towards the outer wall of the separator. These differences reduce the capacity of the separator to extract vapor from a given gaseous mixture, but do not greatly impair the exergetic efficiency of the separator.

In this specification the terms "exergetic" and "exergy", are used as follows. Exergy means the fraction of calorific energy of an element or other material which can theoretically be converted to non-calorific energy. To the contrary, anergy is the fraction of the calorific energy which is not convertible into another form of energy. The calorific energy of an element is the sum of its exergy and its anergy. Any thermodynamic transformation occurring without loss of exergy and/or non-thermal energy is called iso-exergetic, and its exergetic efficiency equals unity. Any loss of exergy and/or of non-thermal energy is converted at least partially into anergy, and reduces the exergetic efficiency.

U.S. Pat. No. 3,258,895 shows a device for centrifugal separation of solids from a gaseous medium. In this device, deflecting blades create a swirl within the flowing stream, and straightening blades suppress the swirl after centrifugation and extraction of the particles. Means are provided for preventing re-entrainment of the separated particles. Such means cause flow separation, which is very detrimental to the exergetic efficiency of the process. Flow separation occurs in the inner core of the flowing stream, at locations where no inner wall is present to prevent the spinning fluid from reaching the longitudinal axis of the separator. Altogether, the aforementioned device has a poor exergetic efficiency and thus cannot separate a vapor constituent from a gaseous stream.

British Patent Specification No. 859,607 and its drawings disclose a device for separating suspended solids from fluids including gaseous streams containing vapors. This separator has the shape of a venturi tube having in its throat whirling blades for inducing a swirl in the flowing stream. This induces centrifugal separation within the diverging portion of the venturi tube, where slots and associated particle-catching vanes are provided to extract particles centrifuged to a peripheral wall of the device. In the specification, no mention is made of deliberate flow separation, but flow separation does occur in the diffuser portion of the venturi tube, at locations where no inner wall is present to prevent the spinning fluid from reaching the longitudinal axis of the venturi tube. Thus, significant losses of energy and exergy occur in the main stream, and particle extraction capacity is also lost.

U.S. Pat. No. 4,311,494 shows an axial flow gas cleaning device for separating non-gaseous contaminants from a relatively high velocity gas stream. This centrifugal separator includes means for reducing abrasion of its tubular housing and deflecting elements by the contaminant particles. Notwithstanding these measures and statements in the specification concerning reduction of energy losses in the gaseous stream, whirling blades are provided as shown in FIGS. 2 and 3, thereby causing centrifugal separation to take place in the diffuser portion of the device. As in the above-mentioned British specification, there are substantial losses of energy and exergy in the main stream, along with reduced particle extraction capacity.

To summarize, some of the known processes and equipment exhibit poor exergetic efficiencies, and little or no capacity for separating vapor constituents from gaseous streams. Other processes and devices, while providing higher exergetic efficiency, have a limited capacity for extracting vapor and particulate from gaseous streams. However, there is a need for processes and apparatus with a high capacity for extracting vapor constituents from gaseous streams, coupled with high exergetic efficiency. The principal object of the present invention is to fulfill this need.

Another object of this invention is to provide an improved process and apparatus for at least partial subsonic aerodynamic separation of vaporous condensable components from a multiple component gaseous stream.

Another object of this invention is to provide an improved process and apparatus for at least partial subsonic aerodynamic separation of solid and/or liquid aerosols from a gaseous stream.

Other objects and advantages of the invention will appear from the following description and from the attached drawings.

SUMMARY OF THE INVENTION

The invention includes a process for separating liquid and/or solid particles from a gaseous stream containing such particles suspended (including entrained) in a gaseous medium. According to the invention, the process comprises the following steps.

The gaseous stream is introduced into a separation zone having an external wall, an internal wall and, between said walls, an array of deflecting blades and a separate array of straightening blades, said arrays each having generally rounded cross-sections, extending generally in the same direction as said axis and being spaced apart from one another in a direction transverse to said axis to define between them an intervening zone. The stream is passed into said intervening zone through said deflecting blades for accelerating the stream and for inducing within the accelerating flowing stream a swirl which causes the gaseous medium to follow helico-spiral streamlines in said intervening zone.

Within the intervening zone, the swirling gaseous stream is subjected to acceleration, expansion and increased subsonic velocity while maintaining the resultant velocity in a major portion of the cross section of the gaseous stream substantially uniform upon those streamlines encompassed by said portion. With the aid of said substantially uniform resultant velocity and of their inertia, said particles in the swirling gaseous stream are caused to separate from the encompassed streamlines under the influence of substantially similar centrifugal forces which drive the particles outward along paths which diverge from said streamlines and cause the particles to concentrate in an outer layer of the gaseous stream.

At least part of said outer layer of the gaseous stream, with concentrated particles, is withdrawn from the separation zone. Remaining gaseous medium not so withdrawn from the gaseous stream is decelerated while suppressing its swirling motion, by passing it through the array of straightening blades.

A preferred application of the invention is a process for at least partially extracting a condensable component existing at least partially in the form of condensable vapor in a gaseous stream which is composed of multiple components including said condensable component and a gaseous medium. Extraction is performed by passing the gaseous stream substantially adiabatically and substantially isoexergetically through an aerodynamic separator. According to the invention, this process comprises the following steps.

The gaseous stream is introduced into a separation zone having an external wall, an internal wall and, between said walls, an array of deflecting blades and a separate array of straightening blades, said arrays each having generally rounded cross-sections, extending generally in the same direction as said axis and being spaced apart from one another in a direction transverse to said axis to define between them an intervening zone. The stream is passed into said intervening zone through said deflecting blades for accelerating the stream substantially adiabatically and substantially iso-exergetically and for inducing within the accelerating flowing stream a swirl which causes the gaseous medium to follow helico-spiral streamlines in said intervening zone.

Within the intervening zone, the swirling gaseous stream is subjected, substantially adiabatically and substantially isoexergetically, to acceleration, expansion and increased subsonic velocity sufficient for causing substantial condensation of at least part of the condensable component in said intervening zone, while maintaining the resultant velocity in a major portion of the cross section of the gaseous stream substantially uniform upon those streamlines encompassed by said portion. Thereby one can form new particles of condensate and/or form enlarged particles by deposition of condensate on preexisting particles in the gaseous stream. With the aid of said substantially uniform resultant velocity and of their inertia, said particles in the swirling gaseous stream are caused to separate from the encompassed streamlines under the influence of substantially similar centrifugal forces which drive the particles outward along paths which diverge from said streamlines and cause the particles to concentrate in an outer layer of the gaseous stream.

Substantially adiabatically and substantially isoexergetically, said outer layer of the gaseous stream, with concentrated particles, is withdrawn from the separation zone. Remaining gaseous medium and condensed and/or condensable components not so withdrawn are decelerated substantially adiabatically and substantially isoexergetically while suppressing their swirling motion, by passing them through the array of straightening blades of the separation zone.

A particularly preferred form of the foregoing process is performed in an aerodynamic separator having means with a longitudinal axis defining a flow path for movement of said gaseous stream at subsonic velocity substantially throughout said path. This path extends generally in the direction of said axis from a position upstream in the separator through a plurality of zones to a position downstream in said separator. In this particularly preferred process the gaseous stream is caused to flow substantially axially in an axially extending inlet plenum zone upstream of and in communication with the separation zone. In the inlet plenum zone the cross-section of said path decreases in the downstream direction for accelerating the stream substantially adiabatically and substantially isoexergetically. This accelerated stream, while flowing substantially axially, is introduced into the separation zone. The array of deflecting blades of the separation zone at least partly surrounds the array of straightening blades. After passage through the separation zone, gaseous medium decelerated by the straightening blades is introduced into an axially disposed outlet plenum zone defining a flow path cross-section which increases in the downstream direction for further decelerating the gaseous medium substantially adiabatically and substantially iso-exergetically.

The invention also includes aerodynamic separator apparatus useful for separating liquid and/or solid particles from a gaseous stream containing such particles suspended in a gaseous medium. According to the invention, the apparatus comprises the following components and features.

Such apparatus includes a separation zone which has an external wall, an internal wall and, between said walls, an array of deflecting blades and a separate array of straightening blades, said arrays each having generally rounded cross-sections, extending generally in the same direction as said axis and being spaced apart from one another in a direction transverse to said axis to define between them an intervening zone. The deflecting blades are positioned for receiving the stream, for passing it into said intervening zone, for accelerating the stream and for inducing within the accelerating flowing stream a swirl which causes the gaseous medium to follow helico-spiral streamlines in said intervening zone.

The intervening zone is so shaped that it is capable of subjecting the swirling gaseous stream to acceleration, expansion and increased subsonic velocity while maintaining the resultant velocity in a major portion of the cross section of the gaseous stream substantially uniform upon those streamlines encompassed by said portion, and causing said particles, with the aid of said substantially uniform resultant velocity and of their inertia, to separate from the encompassed streamlines under the influence of substantially similar centrifugal forces which drive the particles outward along paths which diverge from said streamlines and cause the particles to concentrate in an outer layer of the gaseous stream.

Means are provided for withdrawing said outer layer of the gaseous stream, with concentrated particles, from the separation zone. The array of straightening blades is positioned for causing remaining gaseous medium not so withdrawn from the gaseous stream to decelerate while suppressing its swirling motion.

A preferred application of the invention is an aerodynamic separator apparatus useful for at least partially extracting a condensable component substantially adiabatically and substantially iso-exergetically from a gaseous stream which is composed of multiple components including said condensable component and a gaseous medium. According to the invention, said apparatus comprises the following components and features.

The device includes a separation zone having an external wall, an internal wall and, between said walls, an array of deflecting blades and a separate array of straightening blades, said arrays each having generally rounded cross sections, extending generally in the same direction as said axis and being spaced apart from one another in a direction transverse to said axis to define between them an intervening zone. The deflecting blades are positioned for receiving the stream, for passing it into said intervening zone, for accelerating the stream substantially adiabatically and substantially iso-exergetically, and for inducing within the accelerating flowing stream a swirl which causes the gaseous medium to follow helico-spiral streamlines in said intervening zone.

The intervening zone is so shaped that it is capable of subjecting the swirling gaseous stream, substantially adiabatically and substantially iso-exergetically, to acceleration, expansion and increased subsonic velocity sufficient for causing substantial condensation of at least part of the condensable component in said intervening zone, while maintaining the resultant velocity in a major portion of the cross section of the gaseous stream substantially uniform upon those streamlines encompassed by said portion, thereby forming new particles of condensate and/or forming enlarged particles by deposition of condensate on preexisting particles in the gaseous stream, and causing said particles, with the aid of said substantially uniform resultant velocity and of their inertia, to separate from the encompassed streamlines under the influence of substantially similar centrifugal forces which drive the particles outward along paths which diverge from said streamlines and cause the particles to concentrate in an outer layer of the gaseous stream.

Means are provided for substantially adiabatically and substantially iso-exergetically withdrawing said outer layer of the gaseous stream, with concentrated particles, from the separation zone. The array of straightening blades is positioned for causing remaining gaseous medium and condensed and/or condensable components not so withdrawn from the gaseous stream to decelerate substantially adiabatically and substantially iso-exergetically while suppressing their swirling motion.

A particularly preferred form of the foregoing aerodynamic separator apparatus comprises means with a longitudinal axis defining a flow path for movement of said gaseous stream at subsonic velocity substantially throughout said path. This path extends generally in the direction of said axis from a position upstream in the separator through a plurality of zones to a position downstream in said separator. This particularly preferred apparatus also includes an axially extending inlet plenum zone which is upstream of and in communication with the separation zone and in which the cross-section of said path decreases in the downstream direction for accelerating the stream substantially adiabatically and substantially iso-exergetically and for introducing this accelerated stream, while flowing substantially axially, into the separation zone. The array of deflecting blades of the separation zone at least partly surrounds the array of straightening blades. An axially disposed outlet plenum zone, in communication with the separation zone, is positioned for receiving gaseous medium decelerated by the straightening blades, and defines a flow path cross-section which increases in the downstream direction for further decelerating the gaseous medium substantially adiabatically and substantially isoexergetically.

Various improvements and illustrative but preferred embodiments, also considered to be inventions in their own right, are described below and illustrated in the accompanying drawings.

BRIEF DESCRIPTION OF THE DRAWINGS

FIG. 1 is a sectional view of an embodiment of the invention, taken on the longitudinal axis thereof, showing its convergent annular separation zone.

FIG. 2 is an enlarged cross section of FIG. 1, taken on section line AA.

FIG. 3 is an enlarged cross section of FIG. 1, taken on section line BB.

DESCRIPTION OF PREFERRED EMBODIMENTS

In the process and apparatus according to the invention, the gaseous stream is accelerated to high subsonic velocity by expansion in a nozzle. The velocity should be substantially the same for all streamlines in the flowing gaseous stream. During expansion, any pre-existing solid and/or liquid particles which may be present, as well as particles which are formed and/or enlarged by condensation undergo inertial separation from the gaseous streamlines. Both liquid and solid particles can be formed by the condensation, but at least partial liquefaction of these solids may facilitate extraction of the particles. Separation occurs by centrifugation, thus creating within the flowing gaseous stream a gradient of concentration of the particles in the same direction as the pressure gradient within said stream. After the gaseous stream has been thus progressively dehomogenized in particles to be separated, its outer layer most enriched in said particles is stripped off by means which derive this layer, separating it from the main stream of which it represents a small fraction.

This derived layer is then separated by known means from the non gaseous constituents it contains, and is either discharged for recycling at an appropriate upstream location of the main stream or at the inlet section of the separator, or disposed of in any other way. The remaining gaseous stream then undergoes a recompression by deceleration in the nozzle. The expansion, the separation and the recompression occur quasi iso-exergetically.

The separation of the particles occurs in an axisymmetric separation chamber with an annular cross-section, bounded by an outer wall, an inner wall, a fixed cascade of deflecting blades which transforms the essentially axial motion of the stream entering the chamber into a helico-spiral motion around the axis of symmetry, and a fixed cascade of straightening blades which transforms the helico-spiral motion of the stream before its exit from the chamber into a substantially axial motion of the stream leaving the chamber. The velocities of the flowing gaseous stream are relatively low upstream and downstream of the separation chamber. Compared with the known processes and apparatuses, the essential advantage of the process and apparatus according to the invention is a considerably improved separation capacity, and simultaneously a high exergetic efficiency. In other words, a larger amount of constituents of the gaseous stream are separated and the required additional energy consumption, in addition to that which corresponds to the theoretical separation work, is relatively small. This fact makes the process and apparatus particularly advantageous in operating costs. Since furthermore the means which are required for embodying the invention are very simple and compact, their capital cost is also small, which results in a very short payback time of the necessary capital cost.

The preferred process includes at least partially extracting components existing at least partially in the form of a condensable vapor in a gaseous stream including multiple components, in which this extraction is performed adiabatically and quasi iso-exergetically in an axisymmetrical aerodynamic subsonic separator. The separator comprises an axial inlet plenum with a decreasing cross-section. It further comprises an axisymmetrical separation chamber bounded by an external wall and an internal wall, and by an inlet section comprising a fixed cascade of deflecting blades and an outlet section comprising a fixed cascade of straightening blades. The separator further comprises an axial outlet plenum with an increasing cross-section. The process comprises introducing axially through the inlet plenum of the separator the gaseous stream having a low velocity and accelerating adiabatically and quasi isoexergetically this gaseous stream in a generally axial direction up to the inlet section of the separation chamber. The process further comprises accelerating adiabatically and quasi iso-exergetically this stream through the cascade of deflecting blades thereby inducing within the accelerating flowing stream a swirl which causes the streamlines of the gaseous medium to follow helico-spiral paths. The process further comprises accelerating adiabatically and quasi isoexergetically the gaseous stream within the separation chamber, up to a maximum subsonic velocity, said expanded stream containing at least particles having formed and/or increased in size as a result of vapor condensation caused by expansion of the gaseous stream and having followed as a result of their inertia paths diverging from the streamlines of the gaseous stream and having thus been caused to move towards the outer layer of the gaseous stream and to concentrate in said outer layer. The process further comprises withdrawing adiabatically and quasi isoexergetically from the main stream the outer layer of the gaseous stream containing the thus concentrated particles, by stripping off this layer from the main gaseous stream at a location situated towards the end of the separation chamber.

The process further comprises decelerating within the cascade of straightening blades of the separation chamber adiabatically and quasi iso-exergetically the gaseous stream and suppressing its swirl, thereby causing the velocity of the gaseous stream to regain a low value and a generally axial direction. The process further comprises decelerating adiabatically and quasi isoexergetically the main gaseous stream having left the separation chamber and entering the outlet plenum of the separator. In the process the total expansion accelerates the gaseous stream up to a high subsonic velocity which is identical or quasi-identical for all streamlines within the gaseous stream, and the particles separating from any streamline of the gaseous stream are subject to identical or quasi-identical centrifugal forces driving them towards the outer layer of the flowing gaseous stream.

A preferred separator according to the invention comprises:

(a) an axisymmetric outer wall having the shape of a convergent/divergent nozzle, (b) a central inner core coaxial with the outer wall, comprising a suitably rounded upstream extending nose portion the downstream base of which is joined to the upstream base of an elongated conical portion which is located downstream from the nose portion, (c) a fixed cascade of deflecting blades bound with the inner core and with the outer wall, the inlet and outlet cross-sections of said cascade being cylindrical surfaces coaxial with the outer wall and the inner core, (d) a fixed cascade of straightening blades bound with the inner core and with the outer wall, the inlet and outlet cross-sections of said cascade being cylindrical surfaces coaxial with the outer wall and the inner core, and (e) an inner stripping off wall, coaxial within the outer wall and of which the upstream portion is located close to the downstream end of the cascade of straightening blades, and having a shape similar to the shape of the surrounding outer wall.

In a further embodiment the invention includes apparatus for at least partially extracting components existing at least partially in the form of a condensable vapor in a gaseous stream including multiple components, in which said extraction is performed adiabatically and quasi isoexergetically in an axisymmetrical aerodynamic subsonic separator having:

an axial inlet plenum with a decreasing cross-section, an axisymmetrical separation chamber which is bounded by an external wall and an internal wall, and by an inlet section comprising a fixed cascade of deflecting blades and an outlet section comprising a fixed cascade of straightening blades, and an axial outlet plenum with an increasing cross-section, these elements being formed by means including:

(a) an axisymmetric outer wall having the shape of a convergent/divergent nozzle, (b) a central inner core coaxial with the outer wall, comprising a suitably rounded upstream extending nose portion the downstream base of which is joined to the upstream base of an elongated conical portion which is located downstream from the nose portion,
(c) means binding the fixed cascade of deflecting blades and the fixed cascade of straightening blades with the inner core and with the outer wall,
(d) an inner stripping off wall, coaxial with the outer wall and of which the upstream portion is located close to the downstream end of the cascade of straightening blades, and having a shape similar to the shape of the surrounding outer wall.

In the apparatus of the invention, the inlet and the outlet cross-sections of both the cascade of deflecting blades and the cascade of straightening blades are preferably cylindrical surfaces coaxial with the outer wall and the inner core.

FIG. 1 shows a particularly preferred embodiment of the process and apparatus according to the invention. The gaseous stream to be separated, indicated by arrows, enters the inlet plenum zone 16 of an axisymmetric nozzle. In the inlet plenum 16, on the axis of the nozzle, is a member having the shape of a blunt, rounded nose 20 facing upstream and connected by low drag or stream-lined supports (not shown) to the wall 21 of the plenum.

Nose member 20 connects with a conical member, also located on the axis, having its apex pointing downstream and constituting the inner wall 19 of chamber 17. Chamber 17 is a separation chamber or zone which is further defined by an outer wall 18, a cascade 22 of deflecting blades and a cascade 26 of straightening blades. Outer wall 18 of chamber 17 connects with outer wall 21 of inlet plenum 16.

Preferably said cascades, which constitute arrays of deflecting and straightening blades, are normally stationary during operation of the apparatus and performance of the process. Still more preferably the arrays of deflecting and straightening blades are fixed in place in the separation zone. Thus, in this embodiment, each of the cascades 22 and 26 is connected between conical inner wall 19 and convergent, conical outer wall 18 of the separation chamber.

Outer wall 18 of chamber 17 may also connect with conical wall 19 by low drag or stream-lined supports (not shown) and extends downstream to an outlet plenum 23 for a main stream (to be further described below) and to an outlet plenum 24 for a derived stream (to be further described below), this outlet plenum being defined in part by stripping off wall 28. Outer wall 18 connects with the outer wall 27 of the plenum 24, and the stripping off wall 28 connects with wall 29, having a frusto-conical shape, of the outlet plenum 23.

In the operation of this apparatus, the gaseous stream enters the inlet plenum zone 16 axially, i.e. moving in a direction that is generally parallel to the axis of the nozzle. It undergoes a first phase of expansion together with an essentially axial acceleration due to the narrowing cross-section of the flow path upstream of the deflecting cascade 22. Preferably the gaseous stream is caused to flow in a generally axial direction throughout the inlet plenum zone and until it approaches near to or enters the array of deflecting blades. Preferably, said gaseous stream is initially caused to flow substantially axially at a velocity which is about mach 0.25 or less in the inlet plenum zone. Then, the gaseous stream may for example be accelerated in the inlet plenum zone to a velocity of about mach 0.4 to about mach 0.6. In the alternative, the gaseous stream may be accelerated in said zone to a velocity of at least about 60% of the maximum mach number attained by the stream in the intervening zone.

Deflecting cascade 22, in which the stream undergoes a second phase of expansion, imparts to the flowing stream a helicospiral motion with a centripetal, radial component illustrated by the path 31 of a fluid streamline. In other words, at the outlet of cascade 22, each streamline has a velocity comprising an axial component, a radial centripetal component, and a circumferential component. Preferably, in deflecting cascade 22, said gaseous stream is accelerated to a velocity of at least about 80% of the maximum mach number attained by the stream in the intervening zone.

In chamber 17, which constitutes the intervening zone of this embodiment, the flow cross-section becomes narrower in the direction of the flow and the flowing stream undergoes a third phase of acceleration and expansion up to the inlet 30 of the straightening cascade 26, which in this embodiment represents the minimum cross-section of the gaseous stream, i.e. the section where the velocity of the steam reaches its maximum value. However, this is lower than the velocity of sound (Mach number below unity). The velocity increase which occurs in the stream after it exits cascade 22 and up to its entry into cascade 26 manifests itself in each of the three components of velocity mentioned above, and preferably does not vary substantially from one streamline to the other.

The swirling gaseous stream is preferably accelerated within the intervening zone up to a subsonic velocity of at least about mach 0.6. Preferably, at least in those instances in which the carrier gas is air having a temperature of about 40° to about 80° C. at the entrance to the inlet plenum zone, the swirling gaseous stream is accelerated within the intervening zone or chamber 17 up to a subsonic velocity of at least about mach 0.9, more preferably at least about 0.95. While operation in such a way that the gaseous stream will attain a maximum subsonic velocity very close to mach one in the intervening zone will be preferred for many applications of the invention in which air and other similar gases are used as carrier gas, it should be understood that lower maximum mach numbers may be preferable with other gases, particularly lighter gases, so that a maximum of 0.65 could for instance be appropriate when hydrogen is the carrier gas.

With the apparatus disclosed herein, one may accelerate the swirling gaseous stream within the intervening zone while maintaining the resultant velocity substantially uniform upon those streamlines encompassed by a portion of the cross section of the gaseous stream representing at least about 75 percent, preferably at least about 90 percent and most preferably substantially all, of the cross section of the stream. In preferred embodiments of the invention, such cross section and such substantially uniform velocity occur at corresponding or equal distances from the deflecting blade outlets along the respective streamlines. Although it is possible to arrange the deflecting blades in arrays that are unlike normal cylinders, in the present embodiment such blades are arranged in an array having outer and inner surfaces defining normal cylinders, and the blades have substantially constant chord, pitch and angular spacing throughout their axial lengths. Thus, although the present embodiment produces streamlines with velocities that increase at progressively greater distances from the deflecting blade outlets, the gaseous stream velocities along the respective streamlines are substantially uniform in an imaginary surface disposed radially inward of such outlets. The increasing velocities on the respective streamlines are preferably also substantially uniform with one another at each of an inwardly progressing succession of such surfaces disposed inwardly of the deflection blade outlets. Thus, for the present embodiment, the imaginary surface or surfaces just mentioned define non-planar cross sections of the gaseous stream in which the substantially uniform velocities occur. Because of the shape of the present embodiment, which may be varied if desired, substantially the entire surface which defines each of such cross sections is at a uniform distance from the central longitudinal axis of the device, i.e. is in the form of a normal cylinder. Moreover, it is particularly preferred that plural non-planar cross sections in which the stream velocities are substantially uniform should be present throughout at least a major portion of the lengths of the streamlines within the intervening zone.

Maximum circumferential velocity of the gaseous stream preferably occurs in at least a major portion and preferably in about 75% to substantially all of the imaginary surface defined by inlet 30 of straightening cascade 26. Cascade 26 causes deceleration which mainly affects the axial and circumferential components of the velocity of the fluid streamlines, so that the size of these components of the flowing stream at the outlet of the straightening cascade 26 regains values similar to the size of the corresponding components of the velocities of the flow at the inlet of the deflecting cascade 22. For example, the gaseous medium may be decelerated by the array of straightening blades to a velocity of about mach 0.65 or less, or even about mach 0.4 or less. Alternatively, the gaseous medium may be decelerated by the straightening blades to a velocity of about 60% or less of the maximum mach number attained by the stream in the intervening zone.

Downstream of straightening cascade 26, the cross-section of the flowing stream increases progressively, thus causing a deceleration of the flow and a correlated pressure increase of the gaseous stream. Preferably, gaseous medium decelerated by the straightening blades is further decelerated in the outlet plenum zone to a velocity which is about mach 0.25 or less.

The foregoing description explains in detail the modifications which occur in what will usually be the main constituent of the gaseous stream, i.e. the carrier gas. The smallest non-gaseous particles which either pre-existed and/or were formed and/or increased in size as a result of vapor condensation during the expansion, follow trajectories close to those of the gaseous streamlines. When those dimensions are close to one micrometer, the particle suspensions constitute aerosols of which the inertial separation requires the application of a field of very intense centrifugal force during a sufficiently long time period.

Such a field is created by the deflecting cascade 22 and its intensity increases considerably in that part of chamber 17 located between the cylindrical outlet cross-section of cascade 22 and the cylindrical inlet cross-section 30 of the straightening cascade 26. Within the latter cross-section 30, the intensity of the field of centrifugal force reaches its maximum and then disappears during the crossing of the straightening cascade 26. The existence of the centrifugal force field in each cylindrical cross-section of the flowing stream in chamber 17 results in the creation of a radial centrifugal pressure gradient within the cross-section itself. The velocity of the flowing gas may reach a level close to the velocity of sound at cross-section 30.

Pre-existence of solid or liquid aerosols within the gaseous stream to be separated according to the invention favors condensation upon the aerosol particles and the correlated growth of their size, which improves the efficiency of their separation in the process and apparatus according to the invention. However, when the separation according to the invention must be performed in a gaseous stream which contains neither particles nor pre-existing nucleation centers in a liquid or solid state, it is necessary to seed and/or to treat the gaseous stream in any known way for introducing such nucleation centers, thus encouraging condensation to occur upon subsonic expansion.

The solid and/or liquid particles pre-existing and/or formed or increased in size as a result of vapor condensation caused by the expansion within the gaseous stream undergo a centrifugation which starts in cascade 22, which has a considerable intensity in chamber 17 and reaches its maximum at cross-section 30, then disappears in the straightening cascade 26. The effect of centrifugation in the deflecting cascade 22 and in chamber 17 is to create a radial centrifugal velocity of the particles relative to the velocity of the gaseous stream, and this during the full run of the particles in chamber 17. The process according to the invention such as shown by FIG. 1 thus moves the particles against the radial pressure gradient which exists at any point in chamber 17. Due to this relative motion of the particles within the stream, most of the particles thus centrifuged reach the outer layer of the flowing stream, in which they accumulate and can coalesce. The centrifugal force field maintains the particles within this outer layer which flows along wall 18 up to the stripping off wall 28 which derives this layer from the main stream and guides it towards the outlet plenum 24 which brings this derived flow into a collecting chamber (not shown).

With the particular embodiment disclosed herein, it is possible to separate the particles from the streamlines which they encompass in the intervening zone, under the influence of centrifugal forces that are substantially identical at any point within the previously specified portion of the cross section of the gaseous stream, and that drive the particles towards the outer layer of the flowing gaseous stream.

According to this preferred embodiment said outer layer of concentrated particles is withdrawn from the gaseous stream by a stripping wall spaced inwardly from and of substantially similar shape to said external wall. Preferably, the stripping wall is located adjacent the downstream end of the intervening zone.

In the embodiment of the invention shown by FIG. 1, one may modify several parameters to modify the field intensity or centrifugal force exerted on the particles, whereby the performance of the process and apparatus may be adapted to different gaseous streams and operating requirements. One such parameter is the maximum Mach number attained in chamber 17. A second such parameter is the ratio between the outer and inner radii of the annular cross-sections of the stream flowing in chamber 17. A third parameter is the length of separation chamber 17.

It is clear that the work used by the process in the form of pressure loss in the gaseous stream between the inlet and the outlet plenums will increase as the theoretical separation work increases. In the application shown in FIG. 1 the flowing stream is organized in such a way as to cause maximum centrifugation of the particles to be separated, while minimizing parasitic pressure losses. More particularly, in the embodiment of the invention shown in FIG. 1, each streamline of the gaseous fluid undergoes an expansion close to Mach 1, which fact causes maximum condensation to occur.

In the embodiment of the invention shown in FIG. 1, the inlet and outlet cross-sections of the cascade of deflecting blades and the cascade of straightening blades are each cylindrical surfaces coaxial with the outer wall and with the inner core of the separator. Similar results may be obtained with frusto-conical instead of cylindrical surfaces. Other modifications may be made without departing from the spirit of the invention. Thus, it should be understood that this embodiment is merely illustrative and is by no means intended to limit the invention, which is to be construed as including all subject matter within the literal scope of the following claims and all equivalents thereof.

I claim:

1. A process for separating liquid and/or solid particles from a gaseous stream containing said particles suspended in a gaseous medium, said process comprising:

introducing the gaseous stream into a separation zone having an external wall, an internal wall and, between said walls, an array of deflecting blades and a separate array of straightening blades, said arrays each having generally rounded cross-sections, extending generally in the same direction as said axis and being spaced apart from one another in a direction transverse to said axis to define between them an intervening zone, passing the stream into said intervening zone through said deflecting blades for accelerating the stream and for inducing within the accelerating flowing stream a swirl which causes the gaseous medium to follow helico-spiral streamlines in said intervening zone, within the intervening zone, subjecting the swirling gaseous stream to acceleration, expansion and increased subsonic velocity while maintaining the resultant velocity in a major portion of the cross section of the gaseous stream substantially uniform upon those streamlines encompassed by said portion, causing said particles in the swirling gaseous stream, with the aid of said substantially uniform resultant velocity and of their inertia, to separate from the encompassed streamlines under the influence of substantially similar centrifugal forces which drive the particles outward along paths which diverge from said streamlines and cause the particles to concentrate in an outer layer of the gaseous stream, withdrawing at least part of said outer layer of the gaseous stream, with concentrated particles, from the separation zone, and causing remaining gaseous medium not so withdrawn from the gaseous stream to decelerate, while suppressing its swirling motion, by passing it through the array of straightening blades of the separation zone.

2. A process according to claim 1 wherein said arrays of deflecting and straightening blades are fixed in place in said separation zone.

3. A process according to claim 1 wherein said array of deflecting blades at least partly surrounds said array of straightening blades.

4. A process according to claim 1 wherein the particles are separated from the encompassed streamlines in the intervening zone under the influence of centrifugal forces that are substantially identical at any point within said portion of the cross section of the gaseous stream, and that drive the particles towards the outer layer of the flowing gaseous stream.

5. A process according to claim 1 wherein at least part of said outer layer is withdrawn from the gaseous stream by a stripping wall spaced inwardly from and of substantially similar shape to said external wall.

6. A process according to claim 1 wherein at least part of said outer layer is withdrawn from the gaseous stream by a stripping wall located adjacent the downstream end of the intervening zone.

7. A process according to claim 1 wherein at least part of said outer layer is withdrawn from the gaseous stream by a stripping wall located adjacent the downstream end of the array of straightening blades.

8. A process for at least partially extracting a condensable component existing at least partially in the form of condensable vapor in a gaseous stream which is composed of multiple components including said condensable component and a gaseous medium, said extraction being performed by passing the gaseous stream substantially adiabatically and substantially iso-exergetically through an aerodynamic separator, said process comprising:

introducing the gaseous stream into a separation zone having an external wall, an internal wall and, between said walls, an array of deflecting blades and a separate array of straightening blades, said arrays each having generally rounded cross-sections, extending generally in the same direction as said axis and being spaced apart from one another in a direction transverse to said axis to define between them an intervening zone, passing the stream into said intervening zone through said deflecting blades for accelerating the stream substantially adiabatically and substantially isoexergetically and for inducing within the accelerating flowing stream a swirl which causes the gaseous medium to follow helico-spiral streamlines in said intervening zone, within the intervening zone, subjecting the swirling gaseous stream, substantially adiabatically and substantially iso-exergetically, to acceleration, expansion and increased subsonic velocity sufficient for causing substantial condensation of at least part of the condensable component in said intervening zone, while maintaining the resultant velocity in a major portion of the cross section of the gaseous stream substantially uniform upon those streamlines encompassed by said portion, thereby forming new particles of condensate and/or forming enlarged particles by deposition of condensate on preexisting particles in the gaseous stream, causing said particles in the swirling gaseous stream, with the aid of said substantially uniform resultant velocity and of their inertia, to separate from the encompassed streamlines under the influence of substantially similar centrifugal forces which drive the particles outward along paths which diverge from said streamlines and cause the particles to concentrate in an outer layer of the gaseous stream, substantially adiabatically and substantially isoexergetically withdrawing at least part of said outer layer of the gaseous stream, with concentrated particles, from the separation zone, and causing remaining gaseous medium and condensed and/or condensable components not so withdrawn from the gaseous stream to decelerate substantially adiabatically and substantially iso-exergetically, while suppressing their swirling motion, by passing them through the array of straightening blades of the separation zone.

9. A process according to claim 8 wherein said gaseous stream is accelerated by said deflecting blades up to a velocity of at least about 80% of the maximum mach number attained by the stream in the intervening zone.

10. A process according to claim 8 wherein the swirling gaseous stream is accelerated within the intervening zone up to a subsonic velocity of at least about mach 0.6.

11. A process according to claim 8 wherein the swirling gaseous stream is accelerated within the intervening zone up to a subsonic velocity of at least about mach 0.9.

12. A process according to claim 8 wherein the swirling gaseous stream is accelerated within the intervening zone while maintaining the resultant velocity in a portion representing at least about 75 percent of the cross section of the gaseous stream substantially uniform upon those streamlines encompassed by said portion.

13. A process according to claim 8 wherein the swirling gaseous stream is accelerated within the intervening zone while maintaining the resultant velocity in a portion representing at least about 90 percent of the cross section of the gaseous stream substantially uniform upon those streamlines encompassed by said portion.

14. A process according to claim 8 wherein the swirling gaseous stream is accelerated within the intervening zone while maintaining the resultant velocity in a portion representing substantially all of the cross section of the gaseous stream substantially uniform upon those streamlines encompassed by said portion.

15. A process according to claim 8 wherein the gaseous medium is decelerated by the array of straightening blades to a velocity of about mach 0.65 or less.

16. A process according to claim 8 wherein the gaseous medium is decelerated by the array of straightening blades to a velocity of about mach 0.4 or less.

17. A process according to claim 8 wherein said arrays of deflecting and straightening blades are normally stationary during performance of said process.

18. A process according to claim 8 wherein said aerodynamic separator has means with a longitudinal axis defining a flow path for movement of said gaseous stream at subsonic velocity substantially throughout said path, said path extending generally in the direction of said axis from a position upstream in said separator through a plurality of zones to a position downstream in said separator, said gaseous stream is caused to flow substantially axially in an axially extending inlet plenum zone which is upstream of and in communication with the separation zone and in which the cross-section of said path decreases in the downstream direction for accelerating the stream substantially adiabatically and substantially iso-exergetically, the accelerated stream is introduced into the separation zone while flowing substantially axially, the array of deflecting blades of the separation zone at least partly surrounds the array of straightening blades and, after passage through the separation zone, gaseous medium decelerated by the straightening blades is introduced into an axially disposed outlet plenum zone defining a flow path cross-section which increases in the downstream direction for further decelerating the gaseous medium substantially adiabatically and substantially iso-exergetically.

19. A process according to claim 18 wherein said gaseous stream is caused to flow substantially axially at a velocity which is about mach 0.25 or less in the inlet plenum zone.

20. A process according to claim 18 wherein said gaseous stream is accelerated in said inlet plenum zone to a velocity of about mach 0.4 to about mach 0.6.

21. A process according to claim 18 wherein said gaseous stream is accelerated in said inlet plenum zone to a velocity of at least about 60% of the maximum mach number attained by the stream in the intervening zone.

22. A process according to claim 18 wherein gaseous medium decelerated by the straightening blades is further decelerated in the outlet plenum zone to a velocity which is about mach 0.25 or less.

23. A process according to claim 18 wherein said gaseous stream is caused to flow in a generally axial direction throughout the inlet plenum zone and until it enters the array of deflecting blades.

24. Aerodynamic separator apparatus for separating liquid and/or solid particles from a gaseous stream containing such particles suspended in a gaseous medium, said apparatus comprising:

a separation zone having an external wall, an internal wall and, between said walls, an array of deflecting blades and a separate array of straightening blades, said arrays each having generally rounded cross-sections, extending generally in the same direction as said axis and being spaced apart from one another in a direction transverse to said axis to define between them an intervening zone, said deflecting blades being positioned for receiving the stream, for passing it into said intervening zone, for accelerating the stream and for inducing within the accelerating flowing stream a swirl which causes the gaseous medium to follow helico-spiral streamlines in said intervening zone, said intervening zone being shaped for subjecting the swirling gaseous stream to acceleration, expansion and increased subsonic velocity while maintaining the resultant velocity in a major portion of the cross section of the gaseous stream substantially uniform upon those streamlines encompassed by said portion, and for causing said particles, with the aid of said substantially uniform resultant velocity and of their inertia, to separate from the encompassed streamlines under the influence of substantially similar centrifugal forces which drive the particles outward along paths which diverge from said streamlines and cause the particles to concentrate in an outer layer of the gaseous stream, means for withdrawing at least part of said outer layer of the gaseous stream, with concentrated particles, from the separation zone, and said array of straightening blades being positioned for causing remaining gaseous medium not so withdrawn from the gaseous stream to decelerate while suppressing its swirling motion.

25. Apparatus according to claim 24 wherein said arrays of deflecting and straightening blades are fixed in place in said separation zone.

26. Apparatus according to claim 24 wherein said array of deflecting blades at least partly surrounds said array of straightening blades.

27. Apparatus according to claim 24 wherein said means for withdrawing at least part of said outer layer of the gaseous stream is a stripping wall spaced inwardly from and of substantially similar shape to said external wall.

28. Apparatus according to claim 24 wherein said means for withdrawing at least part of said outer layer of the gaseous stream is a stripping wall located adjacent the downstream end of the intervening zone.

29. Apparatus according to claim 24 wherein said means for withdrawing at least part of said outer layer of the gaseous stream is a stripping wall is located adjacent the downstream end of the array of straightening blades.

30. Aerodynamic separator apparatus for at least partially extracting a condensable component substantially adiabatically and substantially iso-exergetically from a gaseous stream which is composed of multiple components including said condensable component and a gaseous medium, said apparatus comprising:

means with a longitudinal axis defining a flow path for movement of said gaseous stream at subsonic velocity substantially throughout said path, said path extending generally in the direction of said axis from a position upstream in said separator through a plurality of zones to a position downstream in said separator, a separation zone having an external wall, an internal wall and, between said walls, an array of deflecting blades and a separate array of straightening blades, said arrays each having generally rounded cross-sections, extending generally in the same direction as said axis and being spaced apart from one another in a direction transverse to said axis to define between them an intervening zone, said deflecting blades being positioned for receiving the stream, for passing it into said intervening zone, for accelerating the stream substantially adiabatically and substantially iso-exergetically and for inducing within the accelerating flowing stream a swirl which causes the gaseous medium to follow helico-spiral streamlines in said intervening zone, said intervening zone being shaped for subjecting the swirling gaseous stream, substantially adiabatically and substantially iso-exergetically, to acceleration, expansion and increased subsonic velocity sufficient for causing substantial condensation of at least part of the condensable component in said intervening zone, while maintaining the resultant velocity in a major portion of the cross section of the gaseous stream substantially uniform upon those streamlines encompassed by said portion, thereby forming new particles of condensate and/or forming enlarged particles by deposition of condensate on preexisting particles in the gaseous stream, and causing said particles, with the aid of said substantially uniform resultant velocity and of their inertia, to separate from the encompassed streamlines under the influence of substantially similar centrifugal forces which drive the particles outward along paths which diverge from said streamlines and cause the particles to concentrate in an outer layer of the gaseous stream, means for substantially adiabatically and substantially iso-exergetically withdrawing at least part of said outer layer of the gaseous stream, with concentrated particles, from a downstream portion of the separation zone, and said array of straightening blades being positioned for causing remaining gaseous medium and condensed and/or condensable components not so withdrawn from the gaseous stream to decelerate substantially adiabatically and substantially iso-exergetically while suppressing their swirling motion.

31. Apparatus according to claim 30 comprising means with a longitudinal axis defining a flow path for movement of said gaseous stream at subsonic velocity substantially throughout said path, said path extending generally in the direction of said axis from a position upstream in the separator through a plurality of zones to a position downstream in said separator, an axially extending inlet plenum zone which is upstream of and in communication with the separation zone and in which the cross-section of said path decreases in the downstream direction for accelerating the stream substantially adiabatically and substantially isoexergetically and for introducing this accelerated stream, while flowing substantially axially, into the separation zone, said array of deflecting blades of the separation zone at least partly surrounding the array of straightening blades, and an axially disposed outlet plenum zone, in communication with the separation zone, positioned for receiving gaseous medium decelerated by the straightening blades, and defining a flow path cross-section which increases in the downstream direction for further decelerating the gaseous medium substantially adiabatically and substantially iso-exergetically.

32. Apparatus according to claim 30 wherein said arrays of deflecting and straightening blades are mounted in such a manner that they are normally stationary during operation of said apparatus.

33. Process for at least partially extracting components existing at least partially in the form of a condensable vapor in a gaseous stream including multiple components, in which this extraction is performed adiabatically and quasi iso-exergetically in an axisymmetrical aerodynamic subsonic separator comprising an axial inlet plenum with a decreasing cross-section, an axisymmetrical separation chamber bounded by an external wall and an internal wall, and by an inlet section comprising a fixed cascade of deflecting blades and an outlet section comprising a fixed cascade of straightening blades, said separator further comprising an axial outlet plenum with an increasing cross-section, the process comprising introducing axially through the inlet plenum of the separator the gaseous stream having a low velocity, then accelerating adiabatically and quasi iso-exergetically said gaseous stream in a generally axial direction up to the inlet section of the separation chamber, then accelerating adiabatically and quasi iso-exergetically said stream through the cascade of deflecting blades, thereby inducing within the accelerating flowing stream a swirl which causes the streamlines of the gaseous medium to follow helico-spiral paths, then accelerating adiabatically and quasi isoexergetically the gaseous stream within the separation chamber up to a maximum subsonic velocity, said expanded stream containing at least particles having formed and/or increased in size as a result of vapor condensation caused by expansion of the gaseous stream and having followed as a result of their inertia paths diverging from the streamlines of the gaseous stream and having thus been caused to move towards the outer layer of the gaseous stream and to concentrate in said outer layer, then withdrawing adiabatically and quasi iso-exergetically from the main stream the outer layer of the gaseous stream containing the thus concentrated particles, by stripping off this layer from the main gaseous stream at a location situated towards the end of the separation chamber, then decelerating within the cascade of straightening blades of the separation chamber adiabatically and quasi iso-exergetically the gaseous stream and suppressing its swirl, thereby causing the velocity of the gaseous stream to regain a low value and a generally axial direction, then decelerating adiabatically and quasi iso-exergetically the main gaseous stream having left the separation chamber and entering the outlet plenum of the separator, characterized in that the high subsonic velocity resulting from the total expansion accelerating the gaseous stream is identical or quasi-identical for all streamlines within the gaseous stream, and in that the particles separating from any streamline of the gaseous stream are subject to identical or quasi-identical centrifugal forces driving them towards the outer layer of the flowing gaseous stream.

34. Apparatus for at least partially extracting components existing at least partially in the form of a condensable vapor in a gaseous stream including multiple components, in which this extraction is performed adiabatically and quasi iso-exergetically in an axisymmetrical aerodynamic subsonic separator comprising an axial inlet plenum with a decreasing cross-section, an axisymmetrical separation chamber bounded by an external wall and an internal wall and an inlet section comprising a fixed cascade of deflecting blades and an outlet section comprising a fixed cascade of straightening blades and an axial outlet plenum with an increasing cross-section, these elements being formed by means including an axisymmetric outer wall having the shape of a convergent/divergent nozzle, a central inner core coaxial with the outer wall and comprising a suitably rounded upstream extending nose portion the downstream base of which is joined to the upstream base of an elongated conical portion which is located downstream from the nose portion, means binding the fixed cascade of deflecting blades and the fixed cascade of straightening blades with the inner core and with the outer wall, an inner stripping off wall coaxial with the outer wall and of which the upstream portion is located close to the downstream end of the cascade of straightening blades and having a shape similar to the shape of the surrounding outer wall, characterized in that the inlet and the outlet cross-sections of each the cascade of deflecting blades and the cascade of straightening blades are cylindrical surfaces coaxial with the outer wall and inner core.

* * * * *